Patented Dec. 3, 1935

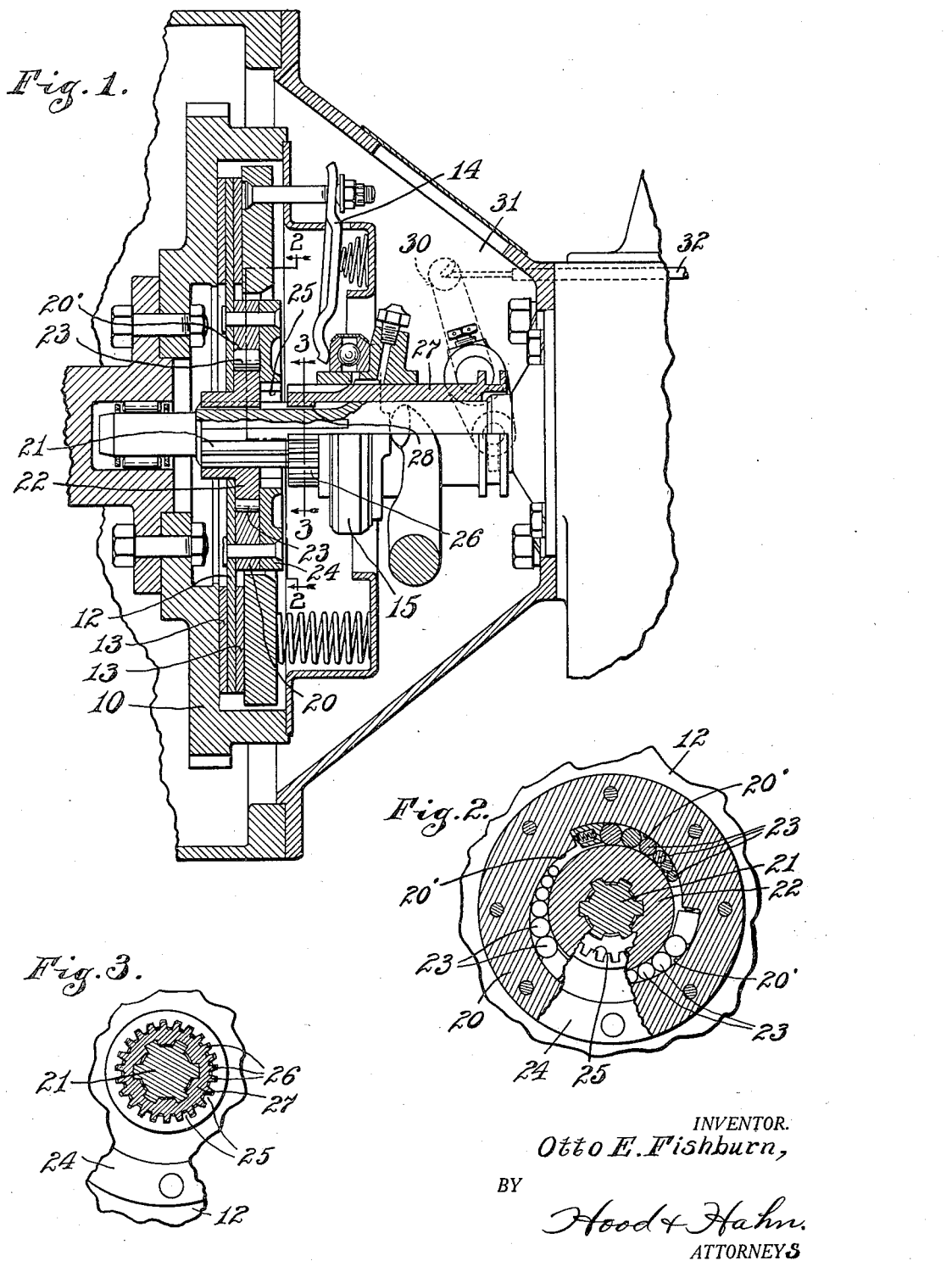

2,023,197

UNITED STATES PATENT OFFICE 2,023,197

FREEWHEELING DEVICE FOR AUTOMOBILES

Otto E. Fishburn, Muncie, Ind., assignor, by mesne assignments, to Borg-Warner Corporation, Chicago, Ill., a corporation of Illinois Application August 11, 1930, Serial No. 474,541

6 Claims. (Cl. 192—48)

The object of my invention is to produce a simple mechanism, forming a part of the driving connection between an automobile and its propelling wheels, whereby the automobile may be automatically free to move forwardly, under its own momentum, independently of the motor when the angular velocity of the propeller shaft exceeds the angular velocity of the motor.

Specifically the invention resides in combination of a simple free wheeling device within the usual clutch unit between the motor and transmission gearing, means being provided for readily rendering the free wheeling device inactive when desired.

The accompanying drawing illustrates my invention.

Fig. 1 is an axial section of an embodiment of my invention;

Fig. 2 is a section on line 2—2 of Fig. 1; and

Fig. 3 is a section on line 3—3 of Fig. 1.

In the drawing 10 indicates the main body of a clutch, of any desired specific form, directly connected to the motor, and most conveniently of the friction disc type. 12 is the usual central disc provided with friction annuli 13—13 coacting with the main body 10, the friction elements being controlled by lever mechanism 14 and a pedal controlled thrust collar 15, the parts thus far described, as illustrated in the drawing, are merely typical and specifically form no part of my present invention.

Secured to element 12 is the outer ring 20 of my free wheeling device, and keyed to the central shaft 21 is the inner ring 22 of the free wheeling device. Rings 20 and 22 have mating wedge pockets 20' within which are mounted clutch rollers 23, the arrangement being such that forward rotation of ring 20 acts to pinch rollers 23 against ring 22 to cause forward rotation of shaft 21 and such that forward rotation of shaft 21, at an angular velocity greater than that of ring 20, will free the rollers 23 from ring 20. Rollers 23 are retained in their pockets by a clutch ring 24 riveted or otherwise secured to ring 20 and provided with a series of internal two-way clutch teeth 25 into which may be projected the two-way clutch teeth 26 carried by a sleeve 27 splined at 28 upon shaft 21, said sleeve 27 being projected through the thrust collar 15. Sleeve 27 may be projected into or out of mesh with ring 24 by any suitable means such for instance as lever 30 journalled in the clutch housing 31 and actuated by a rod 32 carried either directly or through the medium of one or more levers (not shown) to a point of convenient access.

In operation, with sleeve 27 in the position shown in Fig. 1, rotation of element 12 will, through the medium of rollers 23, cause rotation of shaft 21 but if there is a decrease in angular velocity of element 12 at a more rapid rate than the decrease in angular velocity of shaft 21 due to the momentum of the automobile, shaft 21 will be free to move at the higher velocity. Upon projection of teeth 26 of sleeve 27 into mesh with teeth 25 of ring 24, the free wheeling device is rendered inactive.

I claim as my invention:

1. A driving train comprising a friction clutch having inner and outer members and means for frictionally associating and disassociating said members, a driven shaft, said means comprising a thrust collar sleeved over the driven shaft, a one-way clutch ring carried by the inner element of the friction clutch, a coacting one-way clutch ring fixed upon the driven shaft, clutch rollers interposed between said one-way rings, a two-way clutch ring carried by the inner element of the friction clutch, a two-way clutch element splined upon the driven shaft and projected through the friction clutch thrust collar and axially movable into and out of two-way engagement with said first mentioned two-way clutch ring independently of the friction clutch elements, and means independently of the friction clutch associating and disassociating means, by which said last mentioned two-way clutch element may be positioned in or out of two-way engagement with said first mentioned two-way clutch ring.

2. A driving train comprising a friction clutch having inner and outer members and means for frictionally associating and disassociating said members, a driven shaft, a one-way clutch ring carried by the inner element of the friction clutch, a coacting one-way clutch ring fixed upon the driven shaft, clutch rollers interposed between said one-way rings, a two-way clutch ring carried by the inner element of the friction clutch, a two-way clutch element splined upon the driven shaft and axially movable into and out of two-way engagement with said first mentioned two-way clutch ring independently of said friction clutch elements, and means independently of the friction clutch associating and disassociating means by which said last mentioned two-way clutch element may be positioned in or out of two-way engagement with said first mentioned two-way clutch ring.

3. A driving train of the character specified in claim 2 wherein the first mentioned two-way clutch ring overlies the clutch rollers to retain them in axial position.

4. In a motor vehicle, the combination of a driving member, a cover plate carried by said member, a plurality of clutch fingers pivoted to said cover plate, a pressure plate carried by said fingers adjacent said driving member, resilient means between said cover plate and said pressure plate for moving the pressure plate toward the driving member, a clutch disk mounted coaxially with the driving member and adapted to be engaged between said driving member and said pressure plate, a hub on said clutch disk, a driven shaft, a one-way driving clutch positioned between said hub and said driven shaft for operatively connecting said clutch disk and said driven shaft, a positive drive clutch one element of which is carried by said hub for operatively connecting said clutch disk and said driven shaft, and means for engaging and disengaging said positive drive clutch.

5. In a motor vehicle, the combination of a driving member, a cover plate carried by said member, a plurality of clutch fingers pivoted to said cover plate, a pressure plate carried by said fingers adjacent said driving member, resilient means between said cover plate and said pressure plate for moving the pressure plate toward the driving member, a clutch disk mounted coaxially with the driving member and adapted to be engaged between said driving member and said pressure plate, a driven shaft, a clutch member carried by said clutch disk, a cooperating clutch member splined on said driven shaft, clutch rollers positioned between said members, cam surfaces on one of said members adapted to cooperate with said rollers and form a one-way driving connection between said clutch disk and said driven shaft, a positive drive clutch including a member splined on said driven shaft for operatively connecting said clutch disk to said driven shaft.

6. In a motor driven vehicle, the combination of a housing, a driving member, a clutch disk, means for engaging and disengaging said clutch disk with said driving member, a driven shaft, a positive drive clutch for operatively connecting said clutch disk and said driven shaft including a slidable clutch element keyed to said driven shaft, a sleeve surrounding said driven shaft and connected to said slidable clutch element, means independent of the first mentioned means for moving said sleeve to engage and disengage said positive drive clutch, and a one-way driving clutch for operatively connecting said clutch disk and said driven shaft.

OTTO E. FISHBURN.